No. 821,937. PATENTED MAY 29, 1906.
J. L. GREATSINGER.
FILTER.
APPLICATION FILED SEPT. 7, 1905.

2 SHEETS—SHEET 1.

No. 821,937. PATENTED MAY 29, 1906.
J. L. GREATSINGER.
FILTER.
APPLICATION FILED SEPT. 7, 1905.

2 SHEETS—SHEET 2.

WITNESSES
J. H. O'Brien
L. V. Stoltzlen

INVENTOR
Jacob L. Greatsinger
BY Eugene Diven
ATTORNEY

UNITED STATES PATENT OFFICE.

JACOB L. GREATSINGER, OF BROOKLYN, NEW YORK.

FILTER.

No. 821,937.　　　Specification of Letters Patent.　　　Patented May 29, 1906.

Application filed September 7, 1905. Serial No. 277,359.

*To all whom it may concern:*

Be it known that I, JACOB L. GREATSINGER, a citizen of the United States, residing at Brooklyn, in the county of Kings and State of New York, have invented certain new and useful Improvements in Filters, of which the following is a specification.

This invention relates to improvements in filters to be used in clarifying the oil-impregnated exhaust-water in steam-power plants, whereby the water will be rendered fit for return to the steam-generators.

The object of my improvements is to provide means whereby the sectional filters described in my Letters Patent No. 788,312, dated April 25, 1905, may be rendered capable of having the water passed through them under pressure instead of by gravity, as described in said Letters Patent.

A further object is to provide means whereby any free oil contained in the exhaust-water will be separated therefrom at the top of the filter and prevented from passing down into the filter-beds.

I attain the above objects by means of the arrangement of the several parts of the filter, as illustrated in the accompanying drawings, in which—

Figure 1:
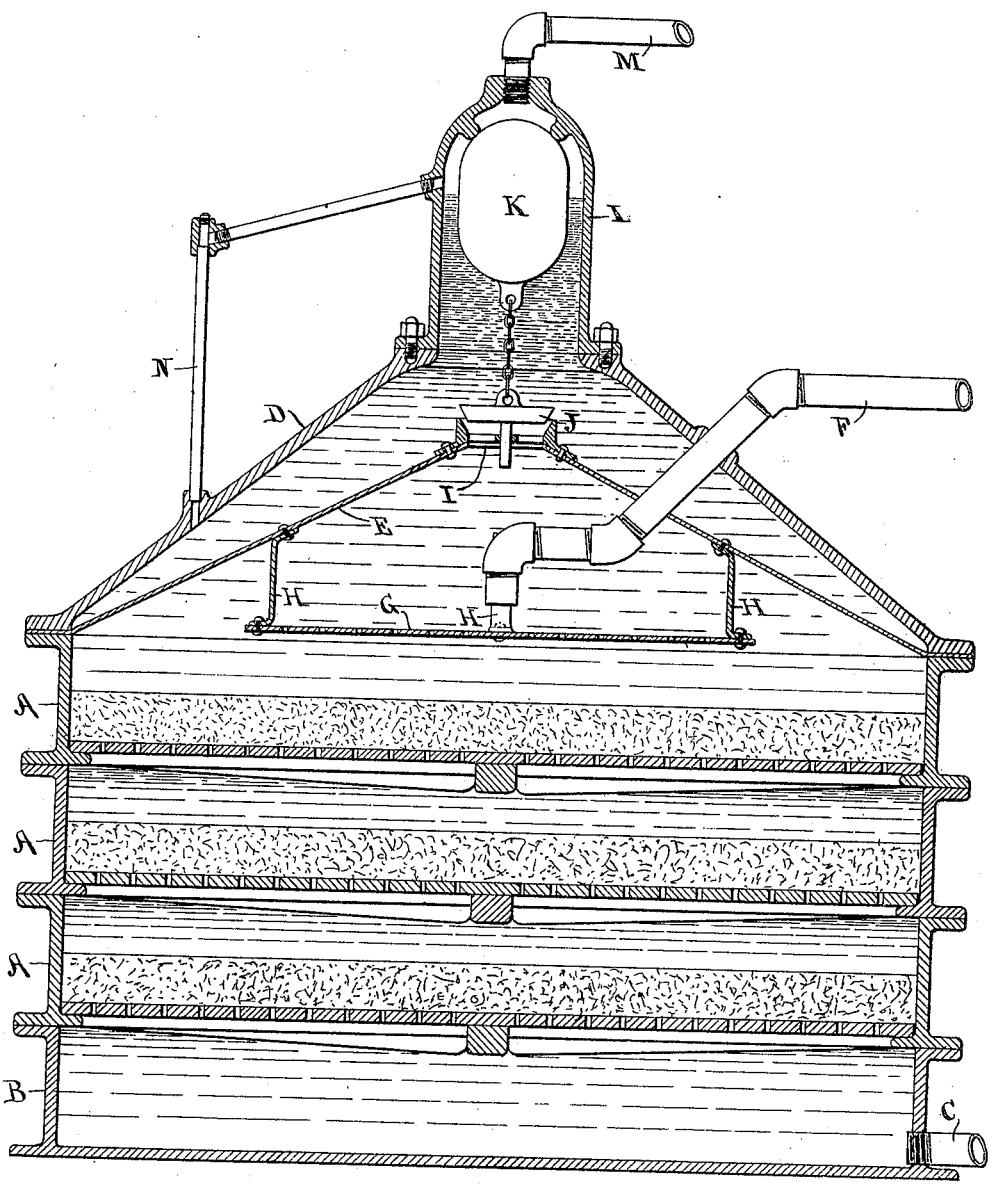
Figure 2:
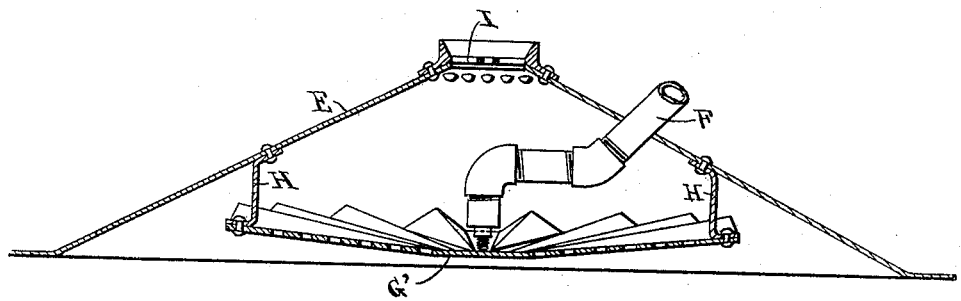
Figure 3:
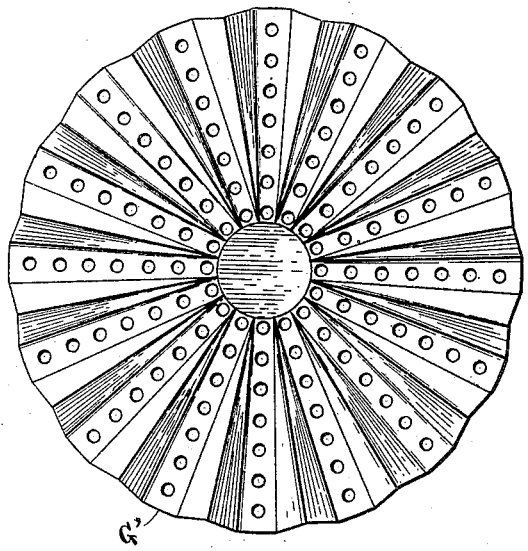

Figure 1 shows a vertical section through a filter embodying my improvement; and Figs. 2 and 3, sectional and plan views, respectively, of a preferred form of baffle-plate to be used in connection therewith.

The filter comprises a plurality of separately-removable sections A, resting upon a base or tank B, from which the clarified water is drawn off by way of a pipe C. These sections are substantially the same as described in my said Letters Patent and are placed one upon another, the joints between them being rendered water-tight by any suitable packing means, and they are so arranged that the top section may be removed from time to time as the filter-bed therein becomes clogged with impurities and a fresh section inserted at the bottom in the manner described in my said Letters Patent.

For the top of the filter I provide a cap D, which rests upon the top section, said cap being divided into two compartments by means of a diaphragm E, preferably of conical form. The exhaust-water is admitted to cap D below the diaphragm E by way of a suitable pipe connection F and is received upon a perforated baffle-plate G, suspended by hangers H from the diaphragm. The baffle-plate prevents the water from being forced in a solid stream upon the filter-bed in the first filter-section and causes it to be spread over a considerable area before descending to said filter-bed, thereby preventing the perforation of the bed by holes made by the inflowing water.

As the oil rises in the diaphragm-chamber it passes up along the conical sides thereof and out through the valved passage I into the top of the cap D, which is provided at the center with a dome L, from which a draw-off pipe M leads away to a suitable oil-receiving receptacle. The level of the oil in the cap D and dome L is indicated by a glass gage N. The oil will be drawn off from time to time by opening a suitably-located valve in the pipe M, the water-pressure in the filter forcing the oil out.

Should the flow through the inlet-pipe F be interrupted for any reason, as when changing filter-sections, the water will fall away from the cap and the oil in the upper part thereof will descend and flow down into the filter-beds below, unless means are provided to prevent it. For this purpose I provide the passage I with a valve J, which when the water is flowing through the filter is held open by a float K, located in the dome L. Should the flow from the pipe F be interrupted and the water in the cap descend through the filter-beds, the float will fall as the oil descends and permit the valve J to close before the oil can descend below the diaphragm, thereby trapping the oil in the upper portion of the cap D and holding it there until the flow through pipe F is again established.

Where a flat baffle-plate is used, any oil passing down through it or rising from the filter-bed beneath it will be caught and retained to a greater or less extent by the horizontal under surface. To avoid this and to give the inflow an upward tendency, whereby the oil will be more readily liberated, I preferably incline the sides of the baffle-plate upwardly from the center, as shown in Figs. 2 and 3, and provide it with upturned corrugations between radiating rows of perforations. By reason of these corrugations oil collecting either on the upper or under surfaces of the baffle-plate will be caused to flow upward and away from the baffle-plate.

In order that the sections A may be changed, the cap and its diaphragm and the pipe connections will be so arranged as to permit the cap to be raised sufficiently to allow for the withdrawal of the upper filter-section and the raising of the lower sections to permit of the insertion of a fresh section at the bottom of the filter-stack. The cap must also be lifted from time to time sufficiently to permit the top of the filter-bed in the top section to be scraped off as fast as the upper surface layers become fouled or clogged by the oil and other impurities intercepted thereby. These scrapings will take place a dozen or more times before the top filter-bed becomes exhausted and a change of sections is required. Any suitable means will be provided to hold the joints between sections in water-tight connection.

Without confining myself to the precise form and details of construction herein illustrated, what I claim as my invention, and desire to secure by Letters Patent, is—

1. The combination with a filter of a removable intake-chamber in which the water to be filtered is received, means therein for separating oil from the water and collecting the oil in the upper portion of the chamber, means for drawing off the oil as it accumulates, and means for preventing the backflow of oil through the chamber.

2. The combination with a filter of an intake-chamber divided into upper and lower compartments, an inlet for water into the lower compartment, a passage-way between compartments whereby oil separated from the water will rise into the upper compartment, and means for closing said passage-way to prevent the backflow of oil.

3. The combination with a filter of an intake-chamber divided into upper and lower compartments, an inlet for water into the lower compartment, a baffle-plate between the inlet and the filter, and a passage-way between the compartments whereby oil separated from the water will rise into the upper compartment.

4. The combination with a filter of an intake-chamber, a conical diaphragm therein dividing the chamber into two compartments, an inlet for water into the lower compartment, a baffle-plate having upwardly-inclined sides positioned between the inlet and the filter, and a passage-way at the top of the diaphragm whereby oil separated from the water will rise into the upper compartment.

5. The combination with a filter of an intake-chamber divided into upper and lower compartments, an inlet for water into the lower compartment, a baffle-plate having upwardly-inclined sides with radiating lines of perforations and upturned corrugations between the rows of perforations positioned between the inlet and the filter, and a passage-way between the compartments whereby oil separated from the water will rise into the upper compartment.

6. The combination with a filter of an inlet-chamber, a conical diaphragm therein dividing the chamber into two compartments, a passage-way at the top of the diaphragm, a valve for said passage-way held normally open, and means whereby the valve will close to prevent backflow through said passage-way.

7. The combination with a filter of an inlet-chamber, a diaphragm therein dividing the chamber into two compartments, a passage-way through the diaphragm, a valve to close said passage-way, and a float in the upper compartment attached to said valve.

8. A filter, comprising a plurality of filter-sections stacked one upon another, in combination with a chambered cap adapted to be secured to the top section, a diaphragm in said cap dividing its chamber into two compartments, means for delivering water to the lower compartment, a passage-way through the diaphragm, and means for closing said passage-way to prevent backflow from the upper to the lower compartment.

In testimony whereof I have affixed my signature in presence of two witnesses.

JACOB L. GREATSINGER.

Witnesses:
 DAVID W. PAYNE,
 C. B. HAMMOND.